Nov. 30, 1926.
R. S. BLAIR
FENDER FOR VEHICLES
Filed April 11, 1921    3 Sheets-Sheet 1
1,608,486
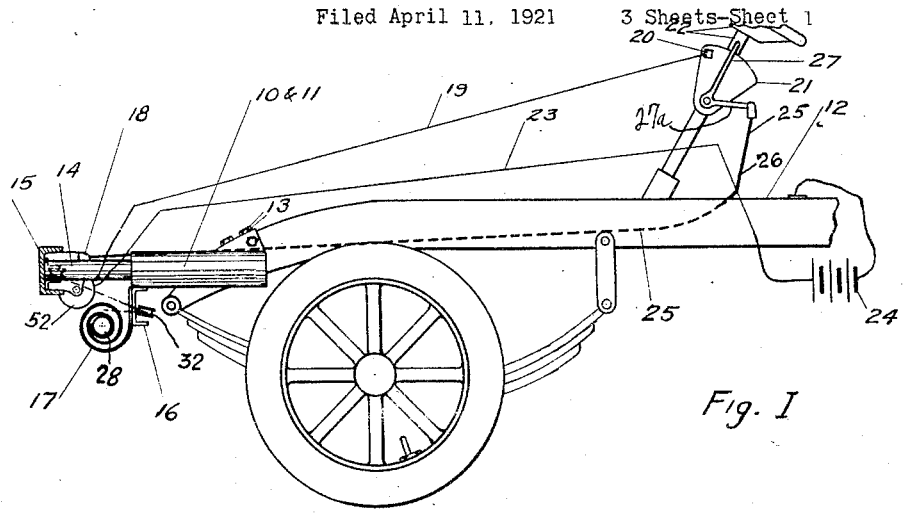
Fig. I
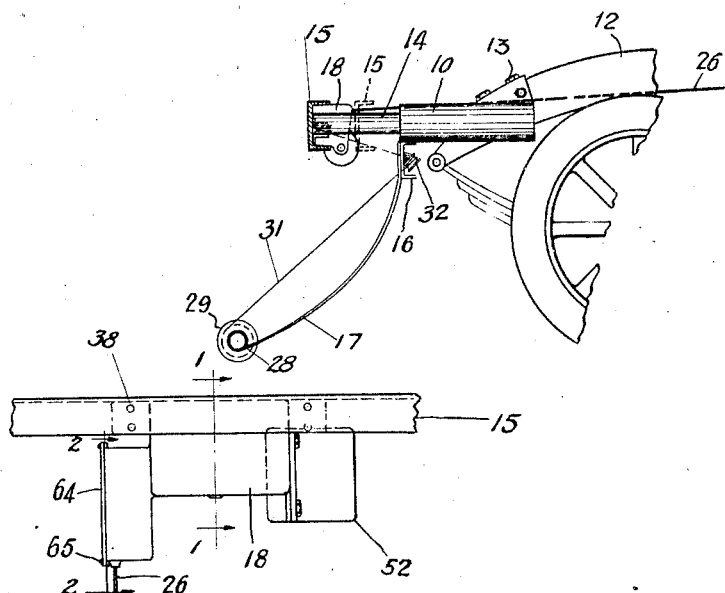
Fig. II
Fig. V
INVENTOR
Robert S. Blair Nov. 30, 1926.
R. S. BLAIR
1,608,486
FENDER FOR VEHICLES
Filed April 11, 1921     3 Sheets-Sheet 2
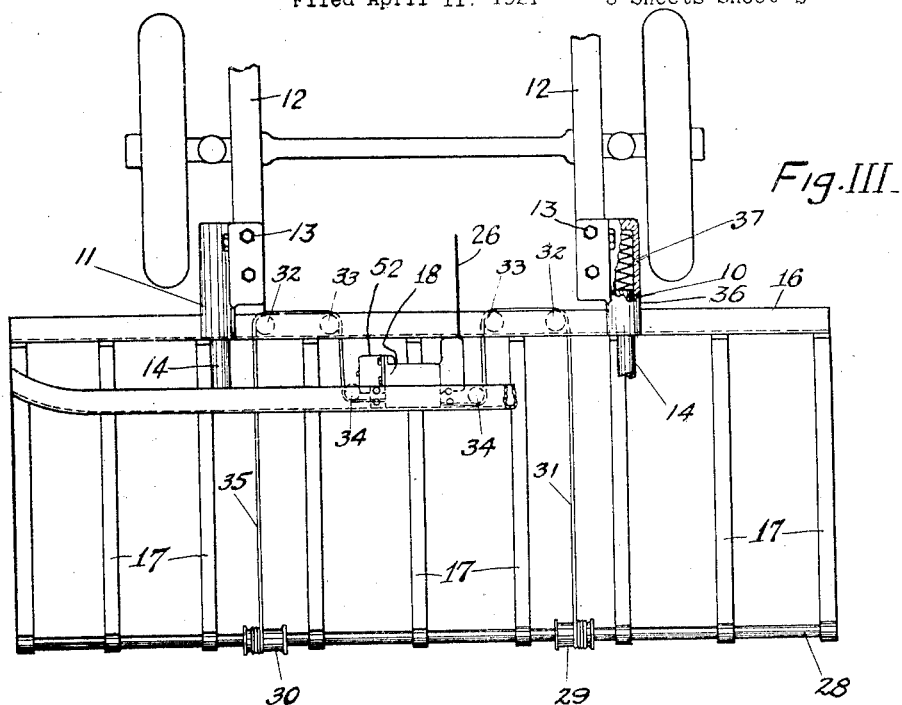
Fig. III
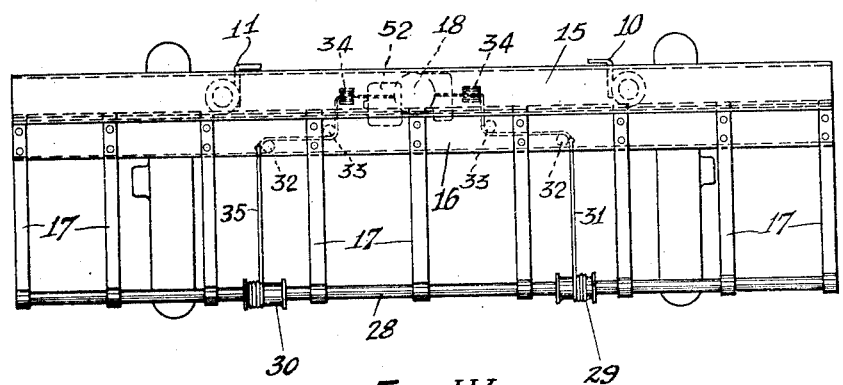
Fig. IV
INVENTOR
Robert S. Blair

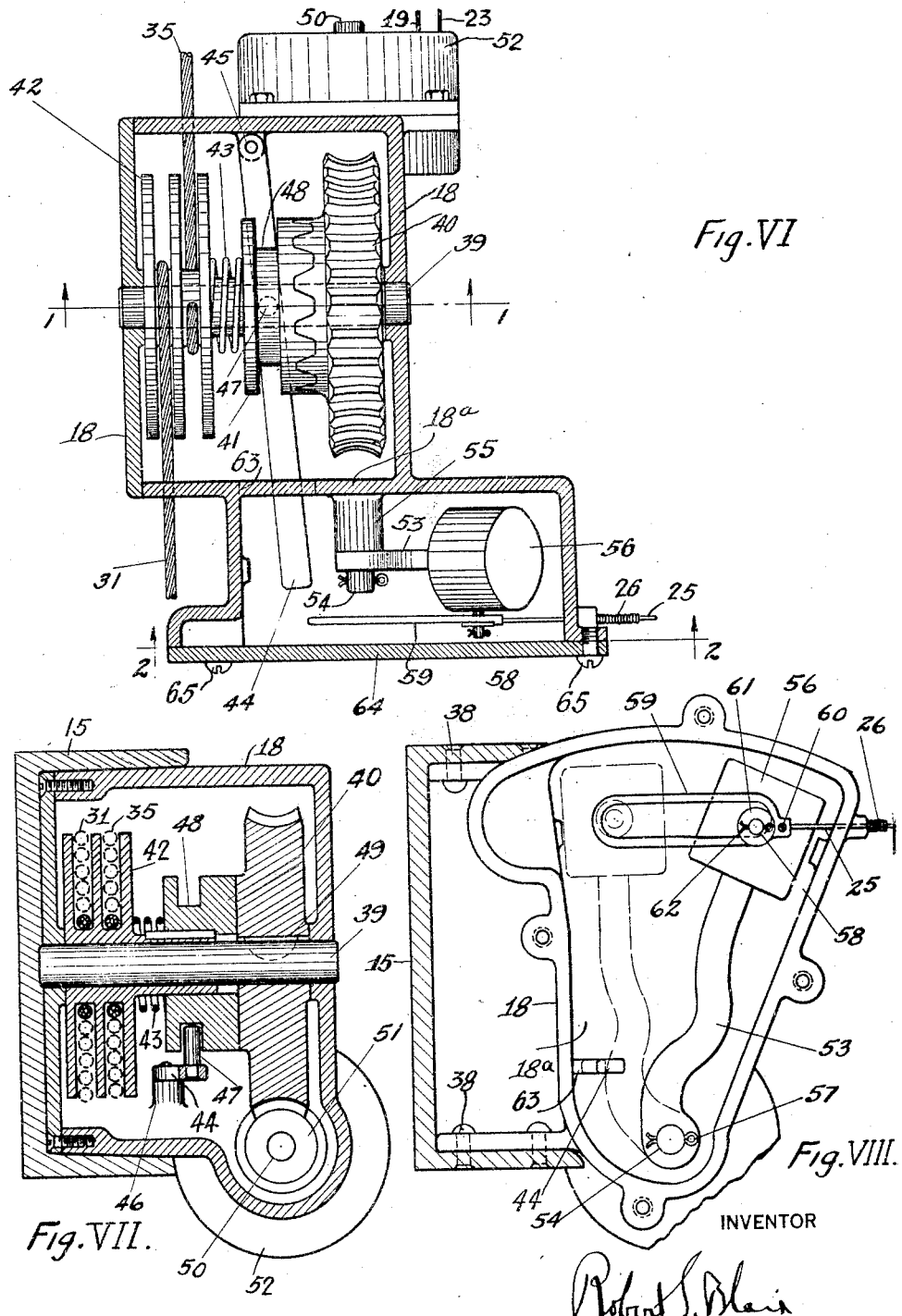

Patented Nov. 30, 1926.

1,608,486

UNITED STATES PATENT OFFICE.

ROBERT S. BLAIR, OF SOUND BEACH, CONNECTICUT.

FENDER FOR VEHICLES.

Application filed April 11, 1921. Serial No. 460,245.

This invention relates to fenders for vehicles and with regard to certain features more particularly to fenders for motor vehicles.

One of the objects thereof is to provide a fender of simple and practical construction and reliable in action. Another object is to provide a mechanism not readily made inoperative by the elements. Another object is to provide a mechanism that will automatically extend itself and prevent an object which has been knocked down by the vehicle from being run over by the wheels. Another object is to provide a fender which will absorb the force of the blow upon striking an object. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawings in which is shown one of the various possible embodiments of this invention, Figure I is a diagrammatic side elevation of the forward part of a motor vehicle showing the fender attached to the forward end of the frame of the vehicle together with the connecting wires and controlling switch, the fender proper being shown in the retracted position.

Figure II is a diagrammatic side elevation of the forward part of the frame of the vehicle shown in Figure I showing the attached fender, with the fender in the extended position.

Figure III is a plan view of the forward end of the motor vehicle shown in Figure I with the attached fender and mechanism mounted on the bumper bar for extending and retracting the fender, the fender being shown in the extended position.

Figure IV is a front elevation of the vehicle shown in Figure I with the attached fender and operating mechanism, the fender being shown in an extended position.

Figure V is a plan view of the operating mechanism of the fender.

Figure VI is a plan view of the operating mechanism of the fender shown in Figure V with the casing broken away to show the internal mechanism.

Figure VII is an end elevation in section of the operating mechanism shown in Figure V the section being taken along the line 1—1 in the directions indicated by the arrows; the arrows and section indicating line shown in Figure V are repeated in Figure VI for clarity.

Figure VIII is an end elevation of the automatic controlling mechanism, the cover of the casing shown in Figure V having been removed to give a clear and unobstructed view of the mechanism in the direction as shown by the arrows on the section line 2—2 in Figure V; the section line and the arrows are repeated in Figure VI for clarity.

Similar reference characters refer to similar parts throughout in the several views of the drawings.

Turning now to Figure I there are shown two brackets 10 and 11 fastened to the forward ends of the motor vehicle frame 12 by bolts such as 13, and each carrying therein a longitudinally slidable member 14. These members 14 support at their projecting forward ends a bumper bar 15. Riveted to the under side of the brackets 10 and 11 is cross member 16 bearing a plurality of parallel flexible steel strips such as 17; these strips 17 are shown in Figure I in a coiled up position. A casing 18 containing operating mechanism for the fender is fastened to the rear of a middle portion of the bumper bar 15 and an electrical conductor 19 connects mechanism contained in casing 18 with the insulated contact 20 of switch 21 which is mounted on the steering column 22. Another wire 23 connects the mechanism contained in casing 18 with the battery 24, which battery is the usual one provided for ignition, the other lighting and starting terminal of the battery 24 being grounded upon the frame 12 of the vehicle. A flexible wire controlling member 25 passing through a guiding sheath 26 connects mechanism contained in casing 18 with an arm 27ª on the end of the switch lever 27 of switch 21. The switch lever 27 being in electrical connection with the frame of the car by reason of being grounded upon the steering column 22, thus an electrical circuit is formed between the battery 24, the fender operating mechanism in casing 18 and the switch 21 by the wires 19 and 23.

Turning now to Figure II there is shown attached to the forward ends of the flexible steel strips 17 a tube 28 which runs across the full width of the fender as shown more clearly in Figure III, the tube 28 having mounted upon it a pair of drums 29 and 30 about which are coiled two flexible metallic cables 31 and 35 which pass over sheaves 32 and 33 mounted upon the cross member 16 and from there over a sheave 34 mounted upon the bumper bar 15, thence into the casing 18 of the fender operating mechanism. As the sheaves and the flexible metallic cable passing over them are arranged in duplicate only one set is mentioned in the above description and in the description hereinafter only one set will be referred to.

It will be seen from the arrangement of the drum 29 mounted upon the tube 28 and the cable 31 wrapped around the drum 29 that, as the flexible strips 17 uncoil themselves and assume the position as shown in Figures II and III, the flexible metallic cable 31 will be drawn out of the fender operating mechanism casing 18 and rolled up upon the drum 29. The flexible strips 17 are so treated during the process of manufacture that, having been uncoiled from the position shown in Figure I to that position shown in Figure II, they will have assumed a position in which they project forward from the motor vehicle and form a scoop-shaped fender ready at all times to pick up any object which might fall in the path of the vehicle. The extent to which the cable can be withdrawn from the casing 18 being limited, it will be seen that it forms a staying member making the position of the fender in the extended position more secure. The sliding member 14 which is slidably mounted in the fender supporting bracket 10 is provided with a collar 36 on the end thereof within the bracket 10. Between this collar and the rear end of the recess in the bracket 10 is a spring 37 which being in a state of compression at all times holds the bumper bar 15 at the forward limit of its travel, the collar 36 coming up against a shoulder in the bracket 10. A piece has been broken out of the upper side of the bracket 10 in the view shown in Figure III giving a clear and unobstructed view of the spring contained in this bracket. As the two brackets supporting the fender upon the frame of the motor vehicle 12 are similar one only is referred to in this description.

Turning now to Figure V there is shown the fender operating mechanism casing 18 which is riveted to the rear side of the bumper bar 15 by means of rivets such as 38.

Turning now to Figure VI the casing 18 of the fender operating mechanism is broken away showing a shaft 39 journaled in the casing 18 and having keyed thereon a worm gear 40 which has a positive jaw clutch formed integral therewith on its left hand face. Splined on the sleeve integral with the cable drum 42 is floating clutch member 41 of a positive jaw type provided with teeth on its right hand face to engage with the similar teeth on the left hand face of the worm gear 40. As will be seen from the drawing the faces of the teeth are at an angle with the axis of rotation of the clutch members. The cable drum 42 is freely mounted upon the shaft 39 so as to permit relative rotary movement between the cable drum 42 and the shaft 39. A coil spring 43 mounted concentric with the shaft 39 between the right hand side of the cable drum 42 and the left hand side of the floating clutch member 41 at all times tends to hold the floating clutch member 41 in engagement with the clutch face of the worm gear 40. The face angle of the teeth of the floating clutch member 41 and of the teeth of the worm gear 40 is so chosen that, a certain degree of torque having been applied to the cable drum 42 by means of the flexible metallic cable 31, the axial thrust on the floating clutch member 41 due to the inclined teeth will result in the floating clutch member 41 being driven out of engagement with the corresponding teeth on the worm gear 40 against pressure exerted by the spring 43. The purpose of this feature will be described later herein.

A clutch shifting lever 44 swiveled about a pin 45 pressed into a lug 46 integral with the casing 18 has mounted in it a clutch shifting pin 47 engaging with a groove 48 in the circumference of the floating clutch member 41. A key 49, securing the worm gear 40 to the shaft 39, and the clutch shifting lever 44 are clearly shown in Figure VII. In Figure VII there is shown journaled in casing 18 at right angles to the axis of the shaft 39 a shaft 50 having mounted thereon a worm 51 engaging with worm gear 40. Returning now to Figure VI there is shown mounted upon the outside end of the shaft 50 an electric motor 52 which is adapted to drive the worm gear 40 through the shaft 50 and thus drive the worm 51 whenever electrical connection is made through the motor 52.

Turning now to Figure VIII a lever 53 is swiveled at one end about the pin 54 pressed into the lug 55 integral with the casing 18, and at the other end of this lever and integral therewith is a heavy weight 56, the lever 53 being retained upon the pin 54 by means of the split pin 57. A stud 58 driven into the weight 56 passes through a slotted member 59 secured upon the end of the control wire 25 by means of the set screw 60. The slotted member 59 is retained about the stud 58 by a large washer 61 which is in turn held upon the stud 58 by the split pin 62. The control wire 25 as before mentioned passes through a sheath 26 and connects with the switch lever 27 mounted upon the steering column 22. At one end the sheath 26 is secured to the casing 18 as shown in Figure VI and therefrom the sheath extends along frame 12 and up to the steering column 22 as shown in Figure I. The free end of the clutch actuating lever 44 passes through a slot 63 in a dividing wall 18$^a$ of the casing 18 and is so located that the lever 53 upon moving over into a position to the left of that shown in Figure VIII will strike the clutch actuating lever 44 and, forcing it over to the left, will withdraw the floating clutch member 41 from engagement with the corresponding teeth on the face of the worm gear 40, compressing the spring 43. A cover plate 64 fastened to the casing 18 by means of screws such as 65 encloses the mechanism in a dust-tight chamber. The lever 53 is provided with a cam surface where it engages with the clutch actuating lever 44 so that the force exerted by the weight 56, when it has moved over to the left so that its center of gravity falls to the left of the center of the pin 54, will be sufficient to move the clutch actuating lever 44 against the force exerted by the spring 43.

The action of the fender in use is substantially as follows: Ordinarily the vehicle will be operated with the fender as shown in Figure I. When the fender is in this retracted position the flexible metallic strips 17 will be coiled up as shown in Figure I and the flexible metallic cable 31 will be entirely unwound from the drum 29 mounted upon the tube 28, being wound upon the cable drum 42 which is mounted on the shaft 39 inside of the casing 18. The torque exerted upon the cable drum 42 by the tendency of the flexible metallic strips 17 tending to unroll (and transmitted through the flexible metallic cable 31) is resisted by the floating clutch member 41 which is splined upon a sleeve integral with the cable drum 42 and which engages with the teeth teeth cut on the side of the worm gear 40. The worm gear 40 is unable to respond to the torque transmitted to it by the floating clutch member 41 as a result of the pull of the cables 31 and 35, due to the fact that the pitch of the worm 51 engaging with it is quite low. It is a well known fact that with low pitched worms it is possible always to drive the worm gear from the worm but it is impossible to do the reverse of this.

Turning now to Figure VIII the lever 53, which provides for an automatic actuation of the fender, is shown in the normal running position, that is with the center of gravity of the weight 56 falling to the right of the axis of the pin 54.

Let us consider now what happens when the bumper bar 15 comes in contact with an object in the path of the vehicle. The bumper bar 15 having struck even a relatively small object, the object due to its inertia will present considerable resistance to the forward movement of the bumper. Consequently the forward movement of the bumper bar 15 in relation to that of the frame of the vehicle 12 will be retarded and the sliding member 14 will be driven back against the spring 37 in the bracket 10. The casing 18, being attached to the bumper bar 15, also is retarded, and lever 53 carrying the weight 56 at its upper end being unrestrained to move forward, that is to the left as shown in Figure VIII, will do so due to its inertia. The force exerted upon the bumper bar 15 having been sufficient to retard the movement of the bumper bar 15 and its attached casing 18 to cause the center of gravity of the weight 56 to move over to the left of the center line of the pin 54 from the position shown in Figure VIII, the cam surface integral with the lever 53 will come in contact with the end portion of the clutch actuating lever 44 and will withdraw the floating clutch member 41 from engagement with the corresponding teeth cut into the face of the worm gear 40. The engagement of the floating clutch member 41 with the worm gear 40 having been broken, the cable drum 42 will be free to revolve under the urge of the cable 31. The cable 31 as it unwinds from the cable drum 42 will permit the flexible metallic strips 17 to unroll themselves from the position as shown in Figure I to that position as shown in Figure II, the cable 31 in the meanwhile coiling itself about the drum 29. The length of the cable 31 is so proportioned that it will be entirely unwound from the cable drum 42 when the flexible metallic strips 17 have reached the extended position as shown in Figure II, and the cable will act at the same time as a stay, strengthening the fender and preventing its further extension.

The fender having performed its purpose by picking up the object which was struck by the bumper bar 15 and having prevented its being drawn under the wheels of the vehicle, the fender can now be withdrawn to the retracted position as follows: The switch lever 27 is pushed forward until it engages with the terminal 20 which will complete the circuit through the wire 19, the electric motor 52, the wire 23 and the battery 24. The circuit having been completed, the motor will at once begin to turn the shaft 50 shown in Figure VII and, revolving the worm 51, will turn the worm gear 40 meshing therewith. In order to engage the floating clutch member 41 with the worm gear 40 it is necessary that the lever 53 shall swing over to the right into the position as shown in Figure VIII thus permitting the spring 43 to press the floating clutch member 41 into engagement with the teeth cut into the face of the worm gear 40. This was accomplished at the same time that the switch lever 27 was moved forward into contact with the terminal 20, by reason of the control wire 25 and slotted member 59 engaging with the stud 58 mounted in the weight 56, the control wire 25 passing from the member 59 through the sheave 26 up to the steering column 22 and connecting with the lever 27ª integral with the switch lever 27.

As has been described above the pitch of the clutch teeth of the clutch member 41 and the worm 40 is such that upon attempting to transmit greater than a predetermined torque through the clutch, the clutch member 41 will spring to the left (as viewed in Figure VI) against the action of the spring 43, thereby disengaging the clutch. This prevents harmful action resulting from operating the motor 52 after the cables 31 and 35 are fully wound upon the drum 42 and the fender is fully retracted. As soon as the fender is fully retracted, the resistance offered by the drum 42 to further rotation immediately causes disengagement of the clutch.

From the description thus far it will be seen that, because of the cooperation of the control wire 25 and the switch lever 27 through the arm 27ª, the engagement of the floating clutch member 41 with the worm gear 40 will take place at substantially the time that the electric motor 52 is set in motion; but it may be desirable that the electric motor 52 should be set in motion before an attempt is made to engage the floating clutch member 41 with the worm gear 40, so as to facilitate the engagement of the floating clutch member 41 with the worm gear 40. This can be accomplished by so adjusting the length of the control wire 25 that the left hand end of the slotted member 59 will come in contact with the stud 58 and swing the lever 53 over into the position as shown in Figure VIII after an electrical circuit is established through the motor 52 by the switch lever 27 engaging with the switch terminal 20.

The position assumed by the lever 53 and the weight integral therewith after having automatically extended the fender is shown by the dotted outline in Figure VIII. The slotted member 59 is provided with a slot of such length that, upon a tendency for the lever 53 to swing over to the left to the dotted position as shown in Figure VIII, it may do so without the stud 58 coming into contact with the left hand end of the slot, thus permitting free unobstructed movement thereof. The slotted member 59 and the control wire 25 are so designed that, should it be desirable to manually operate the fender, that is, to cause the fender to extend itself before the bumper bar 15 should come into contact with an object in the path of the vehicle, this may be accomplished by the operator of the vehicle pulling the switch lever 27 towards him, that is to the right as shown in Figure I, thus causing the control wire 25 to move forward through its sheath 26 and resulting in the right hand end of the slotted member 59 coming up against the stud 58 and, upon continuation of the forward movement of the control wire 25, the lever 53 will be swung over to the left until the center of gravity of the lever 53 and the weight 56 integral therewith falls to the left of the center line of the pin 54, whereupon the lever 53 and its attached weight will respond to the urge of gravity and will swing over towards the left with increasing velocity, the cam surface on the lever 53 finally coming up against the end of the clutch lever 44 and forcing it over to the left, thus withdrawing the floating clutch member 41 out from engagement with the worm gear 40. The cable drum 42 now being free to turn under the urge of the pull of the cable 31, the cable 31 unwinds from the cable drum 42 and the flexible metallic strips 17 are thus released to uncoil from the position as shown in Figure I to that as shown in Figure II, the cable 31 in the meanwhile coiling up upon the drum 29 until it has entirely unwound from the cable drum 42.

From the above description it will be seen that there is provided an automatic means of control of the fender which may be made as sensitive as may be desired, by limiting the distance of the center of gravity of the lever 53 and its attached weight 56 to the right of the vertical line drawn through the center of the pin 54, when the fender is in the retracted position. This sensitiveness may be carried to such a point that it will be unnecessary for the bumper bar 15 to come into actual contact with an object which the vehicle is about to strike, as the retardation of the vehicle due to the sudden application of the brakes by the operator when it is seen that a collision is inevitable would be sufficient to cause the lever 53 and its attached weight 56 to move to the left, causing the mechanism to function as above described, extending the fender.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim:

1. In fender construction for motor vehicles, in combination, a fender comprising a plurality of normally coiled members mounted upon a motor vehicle and means adapted to uncoil said members into an extended position in advance of the front wheels of the vehicle.

2. In fender construction for motor vehicles, in combination, a plurality of resilient elongated members mounted on the vehicle and means adapted to throw said members into substantially parallel position in advance of the front wheels of the vehicle.

3. In fender construction for motor vehicles, in combination, a fender mounted upon a vehicle and inertia controlled means adapted to move said fender into operative position.

4. In fender construction for motor vehicles, in combination, a fender mounted upon the vehicle and inertia controlled means adapted to move said fender into operative position and means adapted to actuate said last means alternatively by manual or automatic control.

5. In fender construction for motor vehicles, in combination, a fender, means adapted to move said fender into operative position and electrically controlled means adapted to retract said fender into inoperative position.

6. In fender construction for motor vehicles, in combination, a fender mounted upon the vehicle, a rotary electric motor adapted to be connected with the usual storage battery upon the vehicle and a connection whereby said motor is adapted to move said fender.

7. In fender construction for motor vehicles, in combination, a fender, means adapted to move said fender into operative position, driven means adapted to retract said fender into inoperative position, and means adjacent the driver for controlling said retracting means.

8. In fender construction for motor vehicles, in combination, a fender mounted upon a vehicle, means adapted to move said fender into operative position, driven means adapted to retract said fender into inoperative position, and means adjacent the driver adapted to control said moving means and said retracting means.

9. In fender construction for motor vehicles, in combination, a fender mounted upon a vehicle, means adapted to move said fender into operative position, and a member adapted to be actuated by inertia imparted thereto by motion of the vehicle to control said moving means.

10. In fender construction for motor vehicles, in combination, a fender mounted on a vehicle, means adapted to move said fender into operative position, a member adapted to be actuated by inertia imparted thereto by motion of the vehicle to control said moving means, and alternative means for manually actuating said member to control said moving means.

11. In fender construction for motor vehicles, in combination, a fender comprising resilient members mounted and so formed as to tend normally to assume a coiled position in front of a vehicle, and means adapted to uncoil said members into an extended position in advance of the front wheels of the vehicle.

12. In fender construction for motor vehicles, in combination, a fender mounted upon a vehicle, a rotary electric motor adapted to be connected with the usual storage battery upon the vehicle, means for moving said fender, and speed reducing means through which said motor is adapted to drive said moving means.

13. In fender construction for motor vehicles, in combination, a fender mounted upon a vehicle, means for moving said fender into and out of operative position before the wheels of the vehicle, a manually actuated member adjacent the driver, a flexible slidable wire connected to said manually actuated member and to said fender to move the latter by manipulation of the former, and a curved tube passing from a point adjacent the driver thence downwardly and forwardly along the frame of the vehicle to said fender containing and guiding said connecting wire to permit a force to be transmitted longitudinally along said flexible wire in either direction from the driver's end thereof.

14. In fender construction for motor vehicles, in combination, a bumper mounted upon the vehicle in advance thereof, a fender mounted adjacent said bumper and comprising a plurality of normally coiled yielding members, and means adapted upon said bumper striking an object to uncoil said members into an extended position in advance of the front wheels of the vehicle.

15. In fender construction for motor vehicles, in combination, a bumper mounted upon the vehicle in advance thereof, a fender mounted adjacent said bumper and comprising a plurality of normally coiled yielding members, means adapted upon said bumper striking an object to uncoil said members into an extended position in advance of the front wheels of the vehicle, and means for recoiling said members into retracted position.

16. In fender construction for motor vehicles, in combination, a plurality of resilient elongated members mounted on the forward portion of the vehicle, means normally holding said members in retracted position, and means operable from the driver's seat adapted to throw said members into extended position substantially parallel in advance of the front wheels of the vehicle.

17. In fender construction for motor vehicles, in combination, a bumper mounted upon the vehicle in advance thereof, a fender mounted adjacent said bumper and comprising a plurality of resilient elongated members, means normally holding said members in retracted position, and means adapted upon said bumper striking an object to throw said members into extended position substantially parallel in advance of the front wheels of the vehicle.

18. In fender construction for motor vehicles, in combination, a plurality of resilient elongated members mounted on the forward portion of the vehicle, means normally holding said members in coiled retracted position, a weighted member extending transversely of said members adjacent their outer ends, and means for releasing said holding means to permit said weighted member to uncoil said members downwardly into extended position before the wheels of the vehicle.

19. In fender construction for motor vehicles, in combination, a plurality of resilient elongated members mounted on the forward portion of the vehicle, means normally holding said members in retracted position, means operable from the driver's seat adapted to throw said members into extended position substantially parallel in advance of the front wheels of the vehicle, and means for restoring said members to retracted position.

20. In fender construction for motor vehicles, in combination, a plurality of resilient elongated members mounted on the forward portion of the vehicle, means normally holding said members in retracted position, means operable from the driver's seat adapted to throw said members into extended position substantially parallel in advance of the front wheels of the vehicle, and means operable from the driver's position for restoring said members to retracted position.

Signed at Stamford, in the county of Fairfield and State of Connecticut.

ROBERT S. BLAIR.